June 28, 1966 S. KIRK 3,258,323
OPHTHALMIC LENS HARDENING APPARATUS
Filed March 26, 1963 2 Sheets-Sheet 1

INVENTOR.
STANLEY KIRK
BY
ATTORNEY

June 28, 1966 S. KIRK 3,258,323
OPHTHALMIC LENS HARDENING APPARATUS
Filed March 26, 1963 2 Sheets-Sheet 2

INVENTOR.
STANLEY KIRK
BY Jerome Bauer
ATTORNEY

United States Patent Office 3,258,323
Patented June 28, 1966

3,258,323
OPHTHALMIC LENS HARDENING APPARATUS
Stanley Kirk, Levittown, N.Y., assignor to Kirk Optical Lens Co., Inc., Bronx, N.Y., a corporation of New York
Filed Mar. 26, 1963, Ser. No. 267,981
2 Claims. (Cl. 65—349)

This invention relates to an apparatus for the treatment by tempering, of ophthalmic lenses.

The tempering of ophthalmic lenses is generally accomplished by subjecting the lens to heat and then rapidly cooling the same under a stream of fluid such as a gas and, more particularly, air. Apparatuses such as disclosed in the United States patents to Jackson 2,409,284 and Oughten et al. 2,455,085, have been known to accomplish this function. However, in such prior art, the ophthalmic lens has been supported in a manner such that portions of the same are covered and obscured and, therefore, prevented from being properly and evenly heated so that the whole of the lens is not subject equally to heat and subsequently to the cooling effects of the fluid. Hence, these supported portions are sometimes heated and cooled unevenly and consequently become distorted with respect to the remainder of the lens.

It is an object of the present invention to provide an ophthalmic lens hardening apparatus in which the ophthalmic lens is supported at its rim edge on its concave side such that the full concave and convex sides of the lens are fully subject to and evenly heated by the heat of the kiln and then cooled rapidly by the cooling fluid sprayed thereon.

A feature and object of the invention is to take advantage of the positioning of the ophthalmic lens supported horizontally about its rim edge to direct into the kiln the stream of cooling fluid sprayed thereon to cool the same and thereby enable the maintenance of an even temperature in the kiln.

Still another object of the invention is to so convey the lens cooling fluid through the housing such that it is preheated and dried such that when the fluid is sprayed on the lens, the fluid is free of moisture and, therefore, results in a lens that is less subject to the occurrence of flaws, damage and breakage.

Still another object and feature of the invention resides in its simplicity of construction that lends itself to inexpensive manufacturing techniques and its ease of operation.

Figure 1:
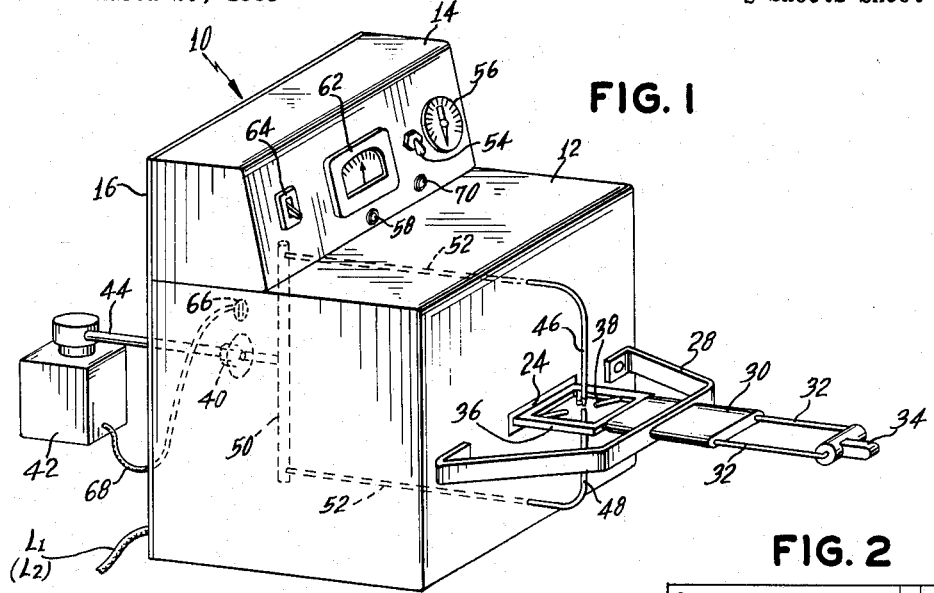
Figure 2:
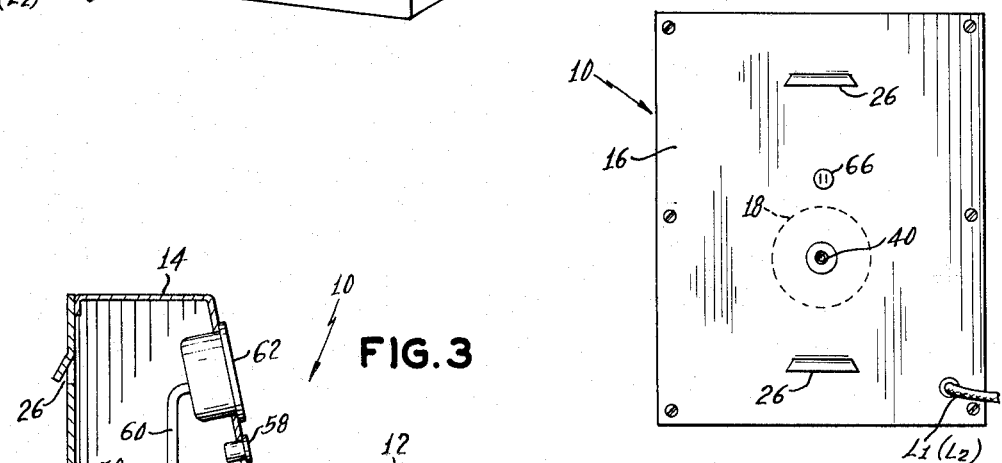
Figure 3:
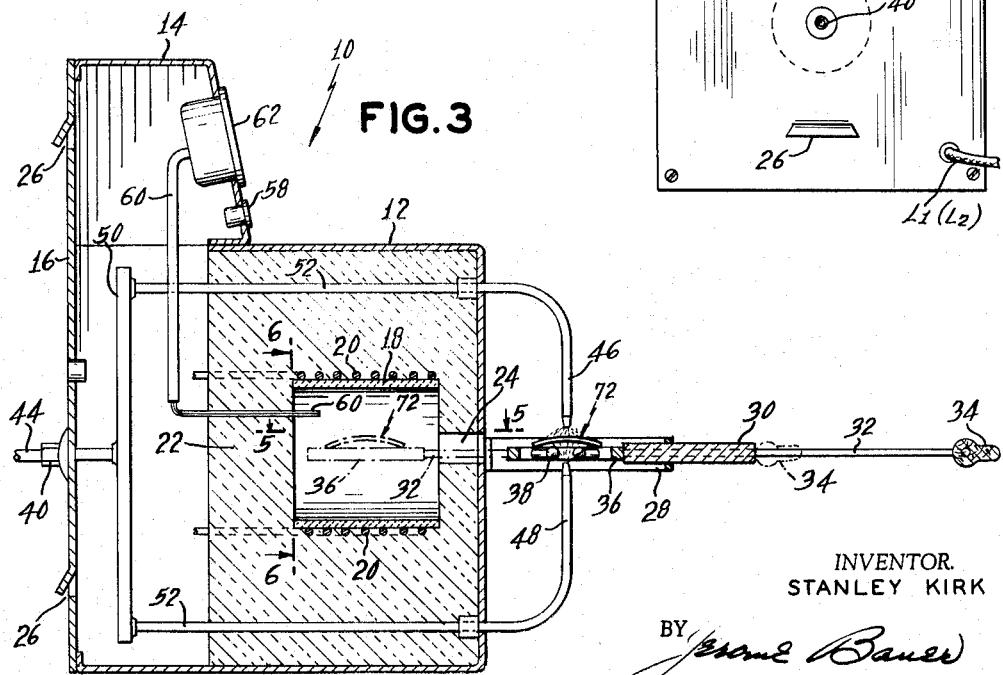
Figure 4:
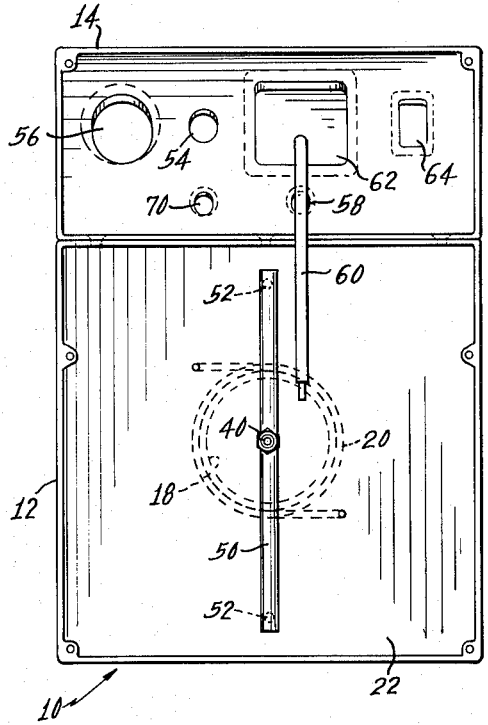
Figure 5:
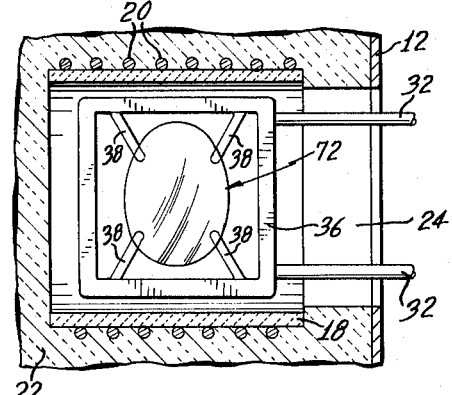
Figure 6:
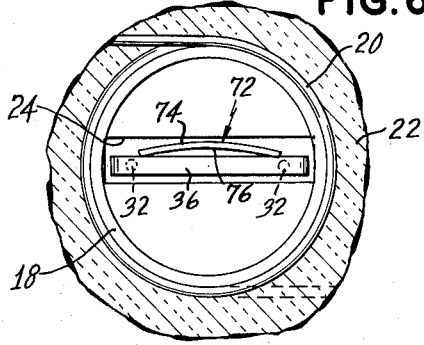
Figure 7:
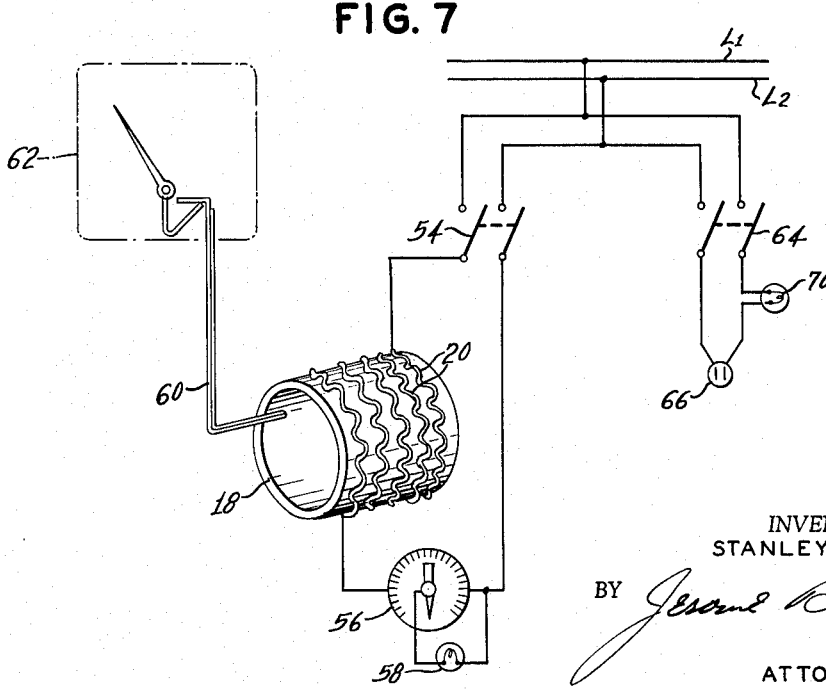

Other and further objects of this invention reside in the structures and arrangements hereinafter more fully described with reference to the accompanying drawings in which:

FIG. 1 is a perspective view of the ophthalmic lens hardening apparatus constructed according to the invention, FIG. 2 is a rear view of FIG. 1, FIG. 3 is a vertical cross-section of the apparatus, FIG. 4 is a rear view cross-section of FIG. 3 with the cover removed, FIG. 5 is an enlarged cross-section of FIG. 3 taken along lines 5—5, FIG. 6 is an enlarged cross-section of FIG. 3 taken along lines 6—6, and FIG. 7 is a diagrammatic view of the wiring circuit.

Referring now to the drawings, the ophthalmic lens hardening apparatus thereshown is generally identified by the numeral 10 and comprises a housing structure 12 that includes an instrument cover panel or portion 14 and a rear cover panel or portion 16. Mounted within the housing 12 is a kiln 18. The kiln 18 is circularly shaped as is more clearly seen in FIGS. 2, 4 and 6 in the diagrammatic view of FIG. 7. The kiln is purposely made circular in shape to eliminate the presence of corners in which pockets of greater heat may form.

The circular shape permits an even heating throughout the area of the kiln by the provision of heating elements 20. Heating elements 20 are positioned in coil fashion about the exterior surface of the kiln 18. This arrangement is commonly referred to as a muffle coil and provides an even heat throughout the kiln interior 18. The kiln is held in place within the housing 12 by insulation 22 which prevents the transmission of heat from the kiln to the exterior surface of the housing 12. However, both the housing 12 and the kiln are provided with a common passageway 24 in the front of the housing that provides access to the interior of the kiln. The passageway 24 is constantly open for a purpose to be described.

The rear cover 16 of the housing 12 is provided with a plurality of vents 26 which permit the dissipation of heat that might normally tend to accumulate in the interior of the housing from the heat of the kiln. Mounted on the housing 12 is a lens conveyor structure which includes a bracket 28. The bracket 28 supports a guide 30 which serves to guide the movements of a lens conveyor that includes a pair of spaced arms 32. The spaced arms 32 of the lens conveyor are connected at their one end with a manually movable handle 34 while the other end of the lens conveyor arms 32 are formed integral with a lens support 36 that includes a plurality of angularly inwardly directed fingers 38. The fingers 38 each are directed toward but terminate short of engagement with each other, thereby leaving a central space between them.

The lens support 36, including the fingers 38, is horizontally disposed in alignment with the constantly open passageway 24 for sliding horizontal movement therethrough into and out of the kiln 18. The tops of the fingers 38 are curved to provide minimum point contact with lenses to be supported thereon. The movement of the lens conveyor and of the lens support 36 into and out of the kiln 18 is supported and guided by the clamp-like arrangement of the guide 30. The conveyor is manually actuated at the handle 34 thereof and normally has two positions, one of which is fully within the kiln 18 as shown in dash lines in FIG. 3 and in full lines in FIGS. 5 and 6. The other position is out of the kiln 18 as shown in full lines in FIGS. 1 and 3. When the conveyor is positioned out of the kiln, the lens support 36 and the fingers 38 thereof are positioned at a point adjacent to the mouth or opening of the passageway 24.

A fluid supply is mounted in the housing 12 and includes a connection 40 that is fixed to the exposed face of the rear cover 16. A fluid supply pump 42 having a conducting connection 44 is adapted to be affixed to the housing 12 at the connection 40 thereof to supply fluid to a pair of vertically disposed spray nozzles 46 and 48. The fluid supplied to the nozzles from the pump 42 is conducted thereto by means of a bifurcated conduit 50 that includes a set of pipes 52 each of which extends through the insulation 22 of the housing and is connected with a respective one of the spray nozzles 46 and 48 within the housing.

The apparatus 10 includes an electrical circuit that is connected with a source of electricity by lines L1 and L2 (see FIG. 7). Included in the electrical circuit is a double pole single throw switch 54 that is mounted on the instrument cover panel 14 of the housing 12. The switch 54 serves to close the circuit from the electrical line across a thermostat 56 to one end of the muffle coils 20 while the other pole of the switch 54 completes the electrical circuit to the opposite end of the coil 20. Included within the line between the switch 54 and the kiln heater coil 20 is a signal lamp 58 also mounted on the cover panel 14. When the temperature of the kiln 18 has attained that degree of heat selected by the operation of the thermostat 56, the light 58 will illuminate on the panel 14 and the thermocouple 60, extending into the kiln 18 through the rear thereof and connected with the meter 62 on the cover panel 14, will indicate the precise temperature of the kiln.

A further double pole single throw switch 64 is connected in circuit with the lines L1 and L2 to complete a circuit to an electrical female outlet 66 mounted on the rear cover 16. The switch 64 is mounted on the front cover portion 14 and, when closed, completes a circuit to the fluid pump 42 connected therewith by an electric line 68. Included in the circuit of the female outlet 66 is a signal light 70 that is mounted on the front cover 14 and which serves to indicate when the circuit switch 64 is closed and the electrical circuit to the female outlet 66 is completed.

In operation, an ophthalmic lens, generally identified by the numeral 72 (see FIGS. 3, 5 and 6), has an upper convex side 74 and a lower concave side 76. The concave side 76 of the lens 72 is normally positioned face down on top of the fingers 38 of the lens support 36 such that the extreme rim edge of the lens is supported and rests on the upper rounded surfaces of the fingers. No more than the rim edge of the ophthalmic lens 72 rests on the fingers and, therefore, only a very slight point edge portion of the lens is engaged with the lens support fingers 38. During the operation of the apparatus 10, the master or kiln switch 54 is actuated or manually flicked from its normally inoperative position as shown in FIGS. 1 and 7 to close the circuit from the lines L1 and L2 to the heater coil 20 of the kiln 18. The thermostat 56 is then operated to select the desired heat to be attained in the kiln 18.

As the heat in the kiln increases, the temperature of the same is indicated on the meter 62. When the kiln has attained the desired temperature as indicated on the meter 62 and controlled by the thermostat 56, the signal lamp 58 will illuminate. Thereafter, the lens conveyor is manually actuated at 34 to move the lens support 36 with the ophthalmic lens 72 resting on the fingers 38 at only four portions of its rim edge. The lens support 36 is moved through the passageway 24 into the kiln 18 as shown in dash lines in FIG. 3 and in full lines in FIGS. 5 and 6. After the lens has been heated in the kiln for a predetermined or selected period of time, it is withdrawn therefrom by the manual operation on the handle 34 to the position at a point adjacent the mouth of the passageway 24. The guide 30 acts as a stop for the movement of the support 36 to properly position the same at the point adjacent the mouth of the passageway. When so positioned, the center of the space between the angularly disposed fingers 38 is substantially in vertical alignment with the vertically disposed spray nozzles 46 and 48.

The switch 64 is then actuated from its inactive position as shown in FIGS. 1 and 7 to close the circuit to the female outlet 66. This, in turn, selectively operates the pump 42 to supply fluid, such as the air, through the conducting pipe 44, the conduit 50 and its connecting pipes 52 to the spray nozzles 46 and 48. As the air passes into the bifurcated conduit 50 and into the pipes 52, it is heated by the heat from the kiln 18 such that the air therein becomes preheated and dried, removing all moisture from the same. Hence, as the air is sprayed from the nozzles 46 and 48 onto the respective convex and concave sides of the lens 72 positioned between them, the absence of moisture from the preheated dried gas eliminates the occurrence of spots or areas of uneven cooling of the lens. Hence, the whole of the lens is evenly cooled to result in a more prefectly tempered lens that is less subject to damage, breakage or flaws.

Advantage is taken of the positioning of the ophthalmic lens 72 to permit a cooling of the kiln 18 in order to maintain in even temperature in the same before a new ophthalmic lens 72 is moved thereinto by the lens conveyor 32. As the air is sprayed from the nozzles 46 and 48 about the convex and concave sides of the lens 72, the normal curvature of the lens and the position of the lens support 36 is such as to direct the sprayed air into the kiln through the constantly open passageway 24. The addition and directed movement of this air into the kiln has a tendency to cool the kiln. Because the kiln normally has a tendency to overheat slightly, the addition of this air into the kiln aids in maintaining the kiln at a more constant and even temperature. The cooling air sprayed on the convex and concave sides of the lens 72 completely envelops the lens and rapidly cools the same. Because the lens is supported at only four points along the extreme rim edge of its concave side, the cooling fluid completely envelops the same and cools it evenly thereby eliminating the creation of areas or spots of distortion of the lens during the cooling operation. The open spaces between the fingers 38 permits the spraying cooling fluid to move rapidly around the lens and because the sprayed fluid is preheated and dried, the lens cools evenly free of distortion.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:

1. An ophthalmic lens hardening apparatus comprising a housing, an insulated electric kiln fully enclosed in said housing, a constantly open passageway defined in said housing and leading to said kiln, a lens conveyor having horizontally disposed lens support means on which a rim edge of an ophthalmic lens may rest, means on said conveyor to move said lens support means in and out of said kiln through said constantly open passageway, and fluid supply means directed at the upper and lower sides of the ophthalmic lens resting on said lens support means when the same is out of said kiln, said fluid supply means extending through said housing and the insulation therein and positioned with respect to said kiln so that the fluid therein is preheated and dried by the heat said kiln in said housing whereby fluid supplied by said fluid supply means to the ophthalmic lens is preheated and dried.

2. An ophthalmic lens hardening apparatus as in claim 1, and said fluid supply means directing fluid vertically on an ophthalmic lens supported horizontally on said lens conveyor support means.

References Cited by the Examiner
UNITED STATES PATENTS

| | | | |
|---|---|---|---|
| 2,409,284 | 10/1946 | Jackson | 65—349 |
| 2,455,085 | 11/1948 | Oughton et al. | 65—349 |
| 2,577,611 | 12/1951 | Eves | 65—349 |
| 2,762,166 | 9/1956 | Vent | 65—114 X |

DONALL H. SYLVESTER, *Primary Examiner.*

F. W. MIGA, *Assistant Examiner.*